(12) United States Patent
Almy et al.

(10) Patent No.: US 8,448,652 B2
(45) Date of Patent: May 28, 2013

(54) SOLAR SYSTEM CLEANING APPARATUS

(75) Inventors: Charles Almy, Berkeley, CA (US);
Brian Wares, San Francisco, CA (US)

(73) Assignee: SunPower Corporation, San Jose, CA (US)

( * ) Notice: Subject to any disclaimer, the term of this patent is extended or adjusted under 35 U.S.C. 154(b) by 536 days.

(21) Appl. No.: 12/748,055

(22) Filed: Mar. 26, 2010

(65) Prior Publication Data
US 2011/0232684 A1   Sep. 29, 2011

(51) Int. Cl.
*B08B 3/04* (2006.01)
(52) U.S. Cl.
USPC ........ 134/104.4; 134/10; 134/104.2; 134/198
(58) Field of Classification Search
USPC .............................. 134/10, 104.2, 104.4, 198
See application file for complete search history.

(56) References Cited

U.S. PATENT DOCUMENTS

| 4,711,972 | A * | 12/1987 | O'Neill .......................... 136/246 |
| 8,240,320 | B2 * | 8/2012 | Mertins et al. ................. 134/172 |
| 2008/0178909 | A1 * | 7/2008 | Alvestig et al. ................. 134/18 |

FOREIGN PATENT DOCUMENTS

| DE | 202007014390 | | 2/2008 |
| DE | 202008009010 | U1 * | 9/2008 |
| WO | WO2008058528 | | 5/2008 |
| WO | WO 2008058528 | A1 * | 5/2008 |

OTHER PUBLICATIONS

Machine translation of DE 202008009010.*

* cited by examiner

Primary Examiner — Michael Barr
Assistant Examiner — Douglas Lee
(74) Attorney, Agent, or Firm — Blakely Sokoloff Taylor & Zafman LLP

(57) ABSTRACT

Solar system cleaning apparatuses and methods of cleaning solar systems are described. A solar system cleaning apparatus includes a vehicle. A first basin is mounted on the vehicle, the first basin to supply a cleaning medium to a solar module. A second basin is mounted on the vehicle, the second basin to collect the cleaning medium from the solar module. A filter is coupled to the first basin and the second basin, the filter to transfer the cleaning medium from the second basin to the first basin.

9 Claims, 10 Drawing Sheets

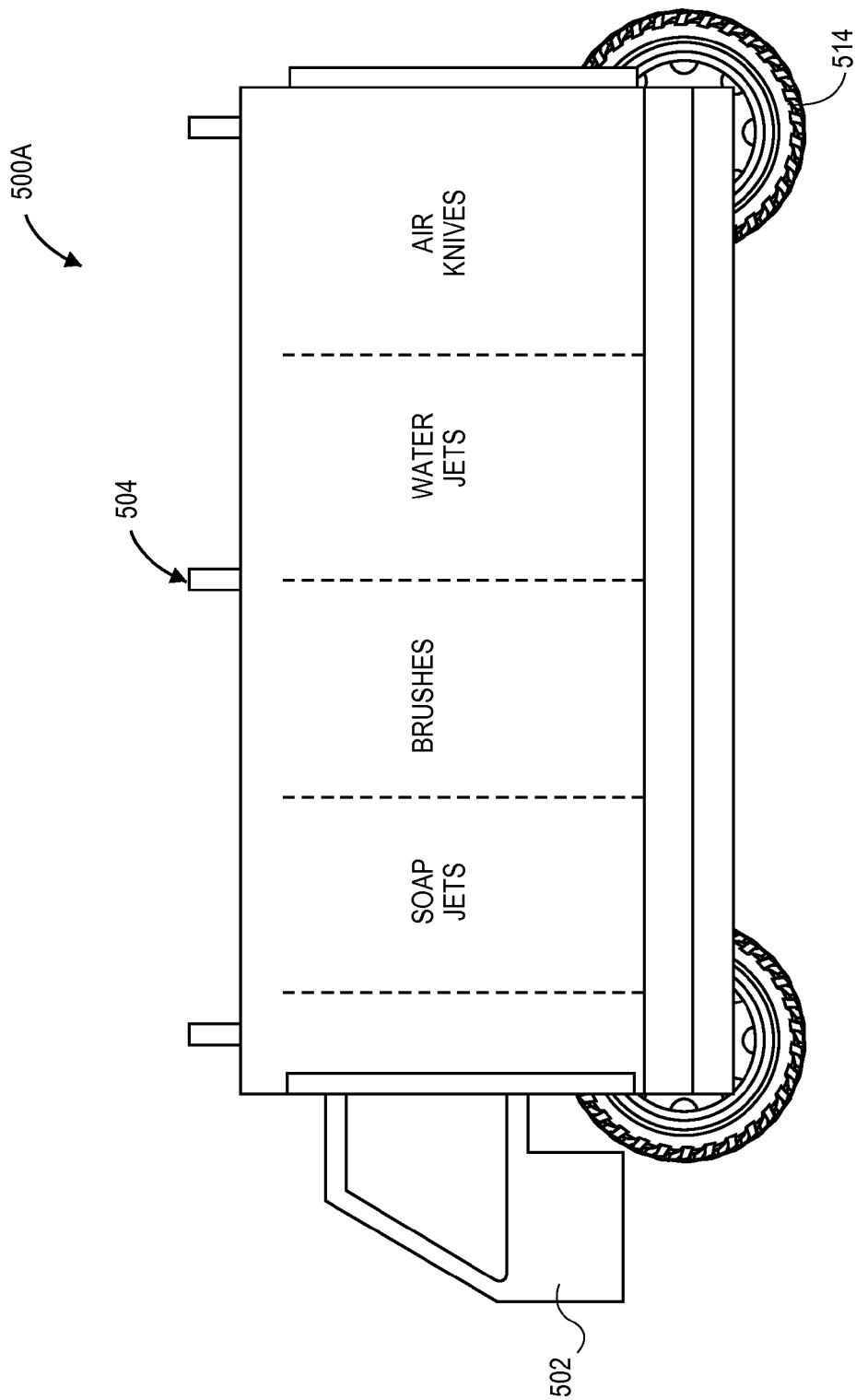

SOLAR SYSTEM CLEANING APPARATUS

TECHNICAL FIELD

Embodiments of the present invention are in the field of renewable energy and, in particular, solar system cleaning apparatuses and methods of cleaning solar systems.

BACKGROUND

Photovoltaic systems, and especially concentrator-type photovoltaic systems, may require routine or even constant cleaning in order to provide maximum power production. Typically, such cleaning is performed with water, with the water that is sprayed on solar panels not recuperated after a cleaning process. Furthermore, the use of sprayed water may affect any supporting tracker, or other surrounding areas of the solar panels, adversely. As water becomes more expensive, cleaning solar panels will also become more expensive. As such, improvements are needed in the evolution of the cleaning of solar systems that include solar panels.

BRIEF DESCRIPTION OF THE DRAWINGS

FIG. 5C illustrates a side-on, cross-sectional view of a solar system cleaning apparatus, in accordance with an embodiment of the present invention.

DETAILED DESCRIPTION

Figure 1:
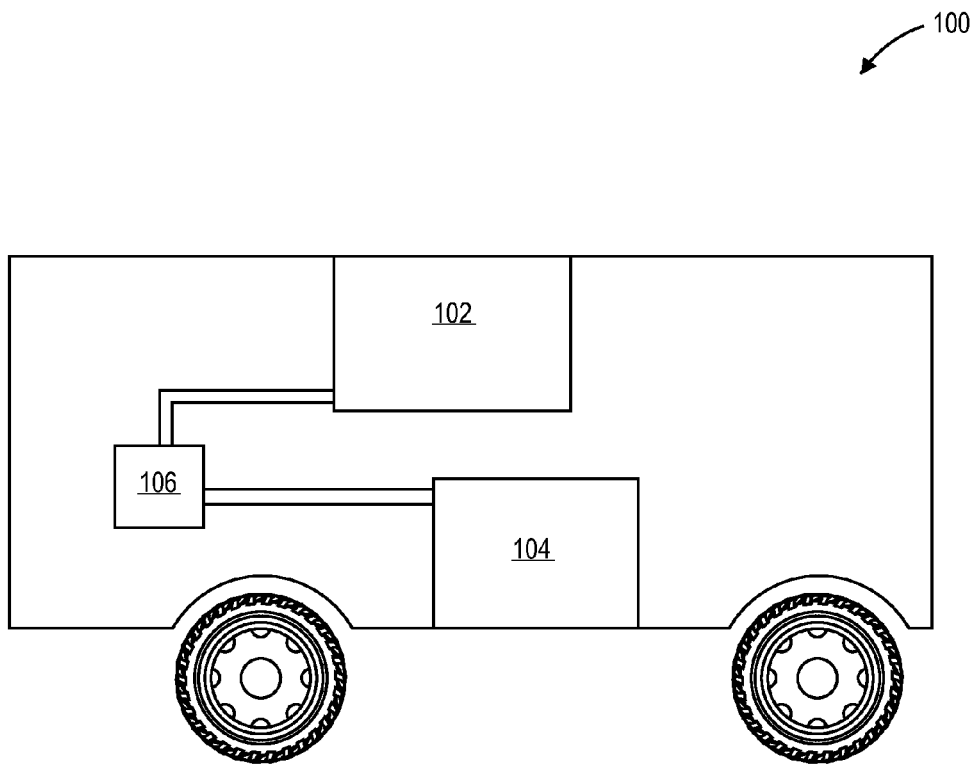
FIG. 1 illustrates a side-on, cross-sectional view of a solar system cleaning apparatus, in accordance with an embodiment of the present invention.

Solar system cleaning apparatuses and methods of cleaning solar systems are described herein. In the following description, numerous specific details are set forth, such as specific vehicle configurations, in order to provide a thorough understanding of embodiments of the present invention. It will be apparent to one skilled in the art that embodiments of the present invention may be practiced without these specific details. In other instances, well-known cleaning techniques, such as cleaning with surfactants or de-ionized water, are not described in detail in order to not unnecessarily obscure embodiments of the present invention. Furthermore, it is to be understood that the various embodiments shown in the Figures are illustrative representations and are not necessarily drawn to scale.

Disclosed herein are solar system cleaning apparatuses. In one embodiment, a solar system cleaning apparatus includes a vehicle. A first basin is mounted on the vehicle, the first basin to supply a cleaning medium to a solar module. A second basin is mounted on the vehicle, the second basin to collect the cleaning medium from the solar module. A filter is coupled to the first basin and the second basin, the filter to transfer the cleaning medium from the second basin to the first basin. In one embodiment, a solar energy collection system includes a plurality of solar modules. A solar system cleaning apparatus is coupled with the plurality of solar modules. The solar system cleaning apparatus includes a track-based vehicle. The track-based vehicle includes a first basin mounted on the vehicle, the first basin to supply a cleaning medium to one or more of the plurality of solar modules. The track-based vehicle also includes a second basin mounted on the vehicle, the second basin to collect the cleaning medium from the one or more solar modules. The track-based vehicle also includes a filter coupled to the first basin and the second basin, the filter to transfer the cleaning medium from the second basin to the first basin. The solar system cleaning apparatus also includes a track system to provide access of the track-based vehicle to each of the plurality of solar modules. In one embodiment, a solar system cleaning apparatus includes a vehicle. A first basin is mounted on the vehicle, the first basin to supply a cleaning medium to a solar module. A second basin is mounted on the vehicle, the second basin to collect the cleaning medium from the solar module and to transfer the cleaning medium from the second basin to the first basin.

Also disclosed herein are methods of cleaning solar systems. In one embodiment, a method of cleaning a solar system includes providing a cleaning medium to a first basin mounted on a vehicle. The method also includes supplying the cleaning medium from the first basin to the solar system to clean the solar system. The method also includes collecting, in a second basin mounted on the vehicle, the cleaning medium from the solar system. The method also includes filtering, by a filter coupled to the second basin and the first basin, the cleaning medium. The method also includes transferring the cleaning medium to the first basin.

In accordance with at least some embodiments of the present invention, an array of solar panels or photovoltaic modules is cleaned with low water expense. For example, as compared with convention spray techniques where any water used is not recuperated, some embodiments involve the reuse of water. Furthermore, embodiments described herein may provide an improved cleaning process, possibly reducing the frequency need of cleaning such an array.

In accordance with an embodiment of the present invention, a moving vehicle is used to straddle a photovoltaic system and wash solar modules of the photovoltaic system while recapturing most of the water used in the washing process. Such a moving vehicle may have onboard the regular trimmings of a vehicle, such as an engine, a cockpit, an ash tray, wheels, etc., a circulatory water system, and a washing area. In one embodiment, the water system pumps water at the photovoltaic array and then captures the dirty water from the photovoltaic array, filters the water and reuses the water. The washing area may contain the washing process such that water spray out of the system, i.e. lost to any possible recapture, is minimized. In some specific embodiments, the washing zone may also include one or more of a soaping station, scrubbers or brushes, rinse water, and air knives or squeegees to strip the water off a tracker that supports photovoltaic modules being cleaned by the moving vehicle. In a particular embodiment, as a moving vehicle progresses along a row, a pair of lower squeegees move out of the way for piers and other obstacles. Other options may include one or more of automatic guidance to for the moving vehicle to stay in line with a tracker supporting an array of photovoltaic modules being washed, sensors to determine if or when the moving vehicle is off of alignment, facilitated communication between the vehicle and modules on the tracker to indicate that the vehicle is to proceed to a washing or, instead, a stow position, sensors to monitor for broken mirrors or other troublesome issues, and automatic suspension to keep the rig of the moving vehicle level as it moves along an array.

The level of recollection and reuse of a cleaning medium by various solar system cleaning apparatuses described in embodiments herein may vary based on design efficiency and general requirements for cost effectiveness. For example, in some embodiments, recollection of greater than 25% of the cleaning medium used is sufficient. In other embodiments, recollection targets of the cleaning medium used is greater than 50% and, in some embodiments, is sought to be greater than 90%. Filtering a used cleaning medium for reuse may be a simple, course approach, but may be more complex in some embodiments. For example in one embodiment, filtering a used cleaning medium for reuse starts with course filtration by physical separation or through rough screens, then a medium filtration through paper filters or finer screen filters, then a fine filtration through a carbon filter. Other embodiment for filtration may include the use of magnetic separation of a sluice box. In some embodiments, a cleaning medium refresh capability is included, such as a separate compartment of a cleaning vehicle to house a fresh supply of the cleaning medium. In some embodiments, the cleaning medium may be a very sophisticated chemical concoction including surfactants and the like; however, in other embodiments, the cleaning medium is water.

In some embodiments of the present invention, a solar system cleaning apparatus is targeted for use on photovoltaic arrays. Sites holding such arrays may typically be dry and there may not be water facilitation at the site, in contrast to, e.g., a thermal collection site which may already be plumbed for water for cooling requirements and water supplies for washing may thus not be an issue. In particular embodiments, the solar system cleaning apparatuses described herein are targeted for concentrator photovoltaic arrays, which may be particularly susceptible to performance interference by the presence of dirt covering the photovoltaic modules in the array.

A unit for cleaning a photovoltaic array may be based on a moving vehicle. For example, FIG. 1 illustrates a side-on cross-sectional, view of a solar system cleaning apparatus, in accordance with an embodiment of the present invention.

Referring to FIG. 1, a solar system cleaning apparatus includes a vehicle 100. A first basin 102 is mounted on vehicle 100, first basin 102 to supply a cleaning medium to a solar module. A second basin 104 is also mounted on vehicle 100, second basin 104 to collect the cleaning medium from the solar module. A filter 106 is coupled to first basin 102 and second basin 104, filter 106 to transfer the cleaning medium from second basin 104 to first basin 102, e.g., for reuse of the cleaning medium such as reuse of water.

In accordance with an embodiment of the present invention, second basin 104 of the above solar system cleaning apparatus is configured to collect the cleaning medium from the solar module by a technique such as, but not limited to, gravity collection or vacuum collection. In an embodiment, the above solar system cleaning apparatus is configured to reuse the cleaning medium by supplying the cleaning medium to the same or another solar module subsequent to transferring the cleaning medium from second basin 104 to first basin 102. In an embodiment, the solar module cleaned by the above solar system cleaning apparatus is a concentrator-cell photo-voltaic module.

In an aspect of the present invention, a solar system cleaning apparatus includes a moving vehicle that straddles a solar module. For example, FIG. 2 illustrates an end-on, cross-sectional view of a solar system cleaning apparatus having support on both sides of a solar module, in accordance with an embodiment of the present invention.

Figure 2:
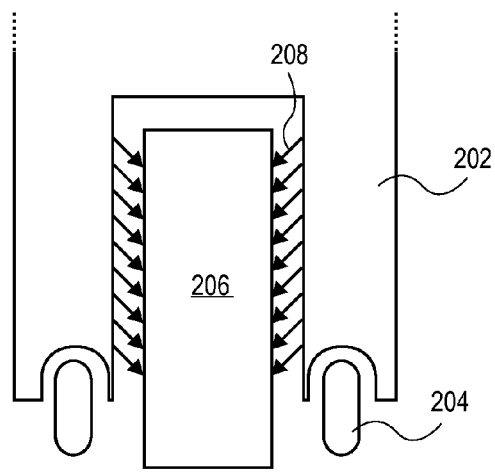
FIG. 2 illustrates an end-on, cross-sectional view of a solar system cleaning apparatus having support on both sides of a solar module, in accordance with an embodiment of the present invention.

Referring to FIG. 2, a vehicle 202 for solar system cleaning is configured to straddle a solar module 206, by supports 204 such as tires or wheels on both sides of solar module 206. In an embodiment, a first basin, such as first basin 102 described above, is configured to supply a cleaning medium to more than one side of solar module 206 at the same time, as depicted by arrows 208 of FIG. 2.

In another aspect of the present invention, a solar system cleaning apparatus includes a moving vehicle that over-hangs a solar module. For example, FIG. 3 illustrates an end-on, cross-sectional view of a solar system cleaning apparatus having support on only one side of a solar module, but exposure on both sides of the solar module, in accordance with an embodiment of the present invention.

Figure 3:
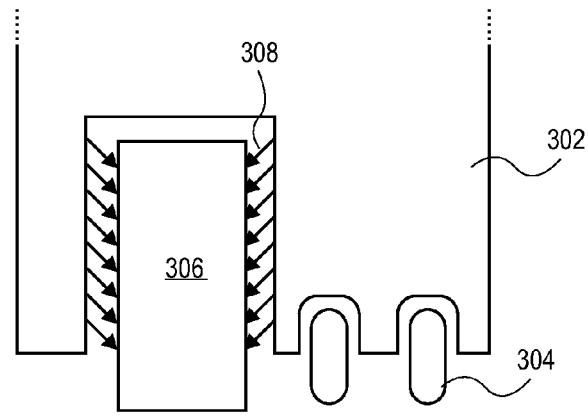
FIG. 3 illustrates an end-on, cross-sectional view of a solar system cleaning apparatus having support on only one side of a solar module, but exposure on both sides of the solar module, in accordance with an embodiment of the present invention.

Referring to FIG. 3, a vehicle 302 for solar system cleaning is configured to over-hang a solar module 306, by supports 304 such as tires or wheels on only one side of solar module 306. In an embodiment, a first basin, such as first basin 102 described above, is configured to supply a cleaning medium to more than one side of solar module 306 at the same time, as depicted by arrows 308 of FIG. 3.

In another aspect of the present invention, a solar system cleaning apparatus includes a moving vehicle that progresses along only one side or face of a solar module, e.g., it is one-sided. For example, FIG. 4 illustrates an end-on, cross-sectional view of a solar system cleaning apparatus having support and exposure on only one side of a solar module, in accordance with an embodiment of the present invention.

Figure 4:
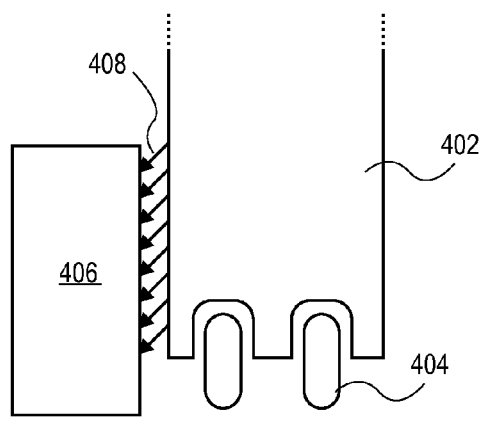
FIG. 4 illustrates an end-on, cross-sectional view of a solar system cleaning apparatus having support and exposure on only one side of a solar module, in accordance with an embodiment of the present invention.

Referring to FIG. 4, a vehicle 402 for solar system cleaning is configured to be exposed to only one side of a solar module 406, by supports 404 such as tires or wheels on only one side of solar module 406. In an embodiment, a first basin, such as first basin 102 described above, is configured to supply a cleaning medium to only to the one side of solar module 306, as depicted by arrows 408 of FIG. 4.

In an aspect of the present invention, a solar system cleaning apparatus includes four points of support and is configured to straddle a photovoltaic array. For example, FIGS.

5A-5F illustrate various views of a solar system cleaning apparatus, in accordance with an embodiment of the present invention.

Figure 5A:
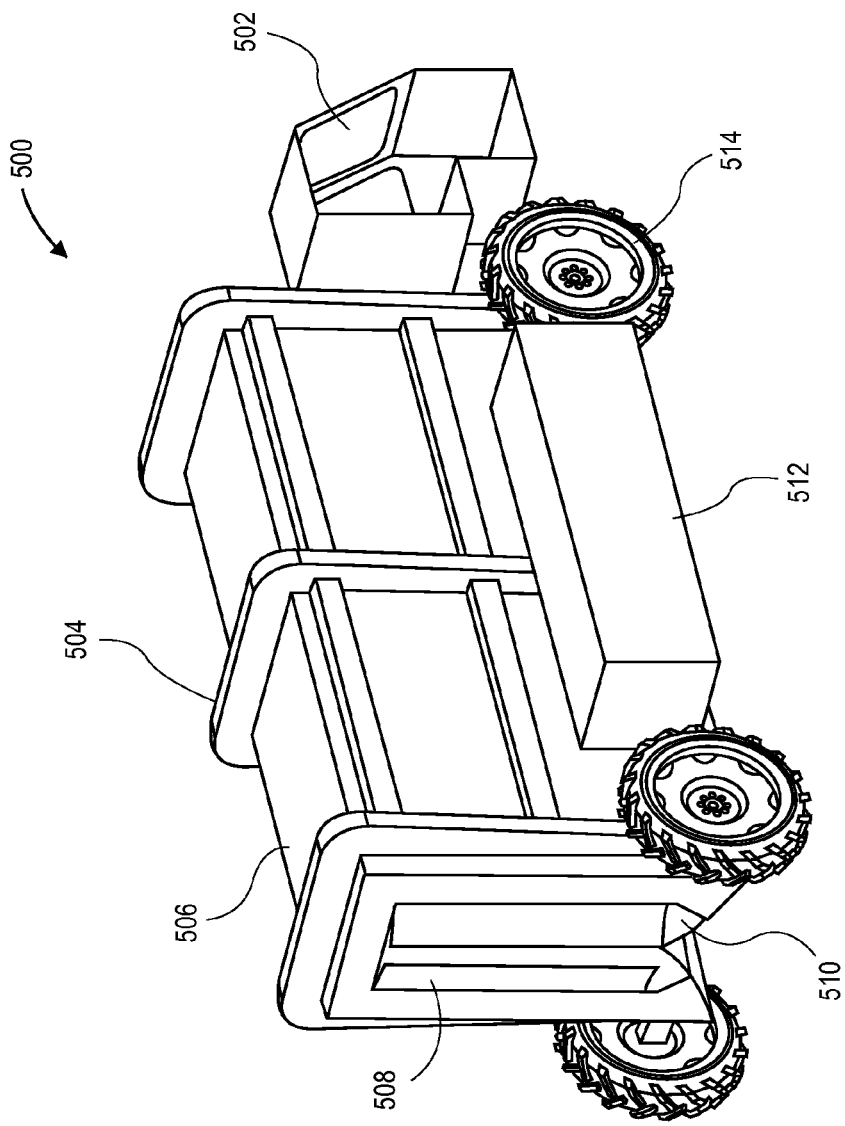
FIG. 5A illustrates a top angled, isometric view of a solar system cleaning apparatus, in accordance with an embodiment of the present invention.

Referring to FIG. 5A, which illustrates a top angled, isometric view of a solar system cleaning apparatus, a solar system cleaning apparatus 500 includes an operator cabin 502 and a chassis 504. Chassis 504 includes a washer housing 506. Solar system cleaning apparatus 500 also includes entrance and exit brushes 508 to clean a solar module when solar system cleaning apparatus 500 straddles the solar module for cleaning. Water capture squeegees 510 are mounted underneath entrance and exit brushes 508. For example, in the back-end view of FIG. 5E, which depicts a water and waste tank 570 and a cabin 560 in an end-on view, water 580 collects in capture squeegees 510 for reuse. Solar system cleaning apparatus 500 also includes an engine or pump system 512 and four tractor wheels 514, as depicted in FIG. 5A.

Figure 5B:
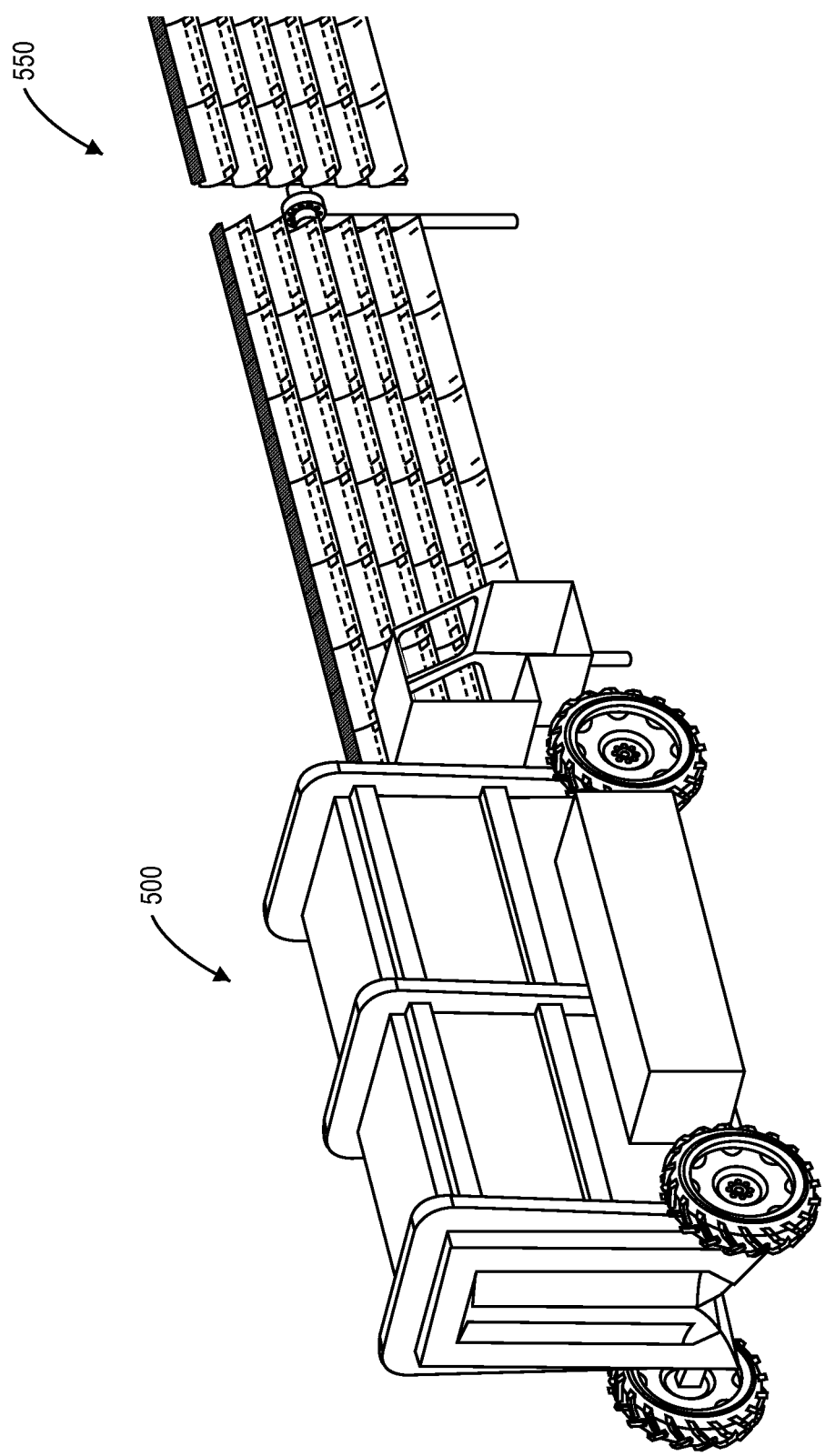
FIG. 5B illustrates a top angled, isometric view of a solar system cleaning apparatus coupled with a plurality of photovoltaic modules, in accordance with an embodiment of the present invention.

Referring to FIG. 5B, which illustrates a top angled, isometric view of a solar system cleaning apparatus coupled with a plurality of photovoltaic modules 500, solar system cleaning apparatus 500 is configured to straddle the plurality of solar modules 550. In an embodiment, the plurality of solar modules 550 has a stow mode for cleaning, as is depicted in FIG. 5B.

Figure 5D:
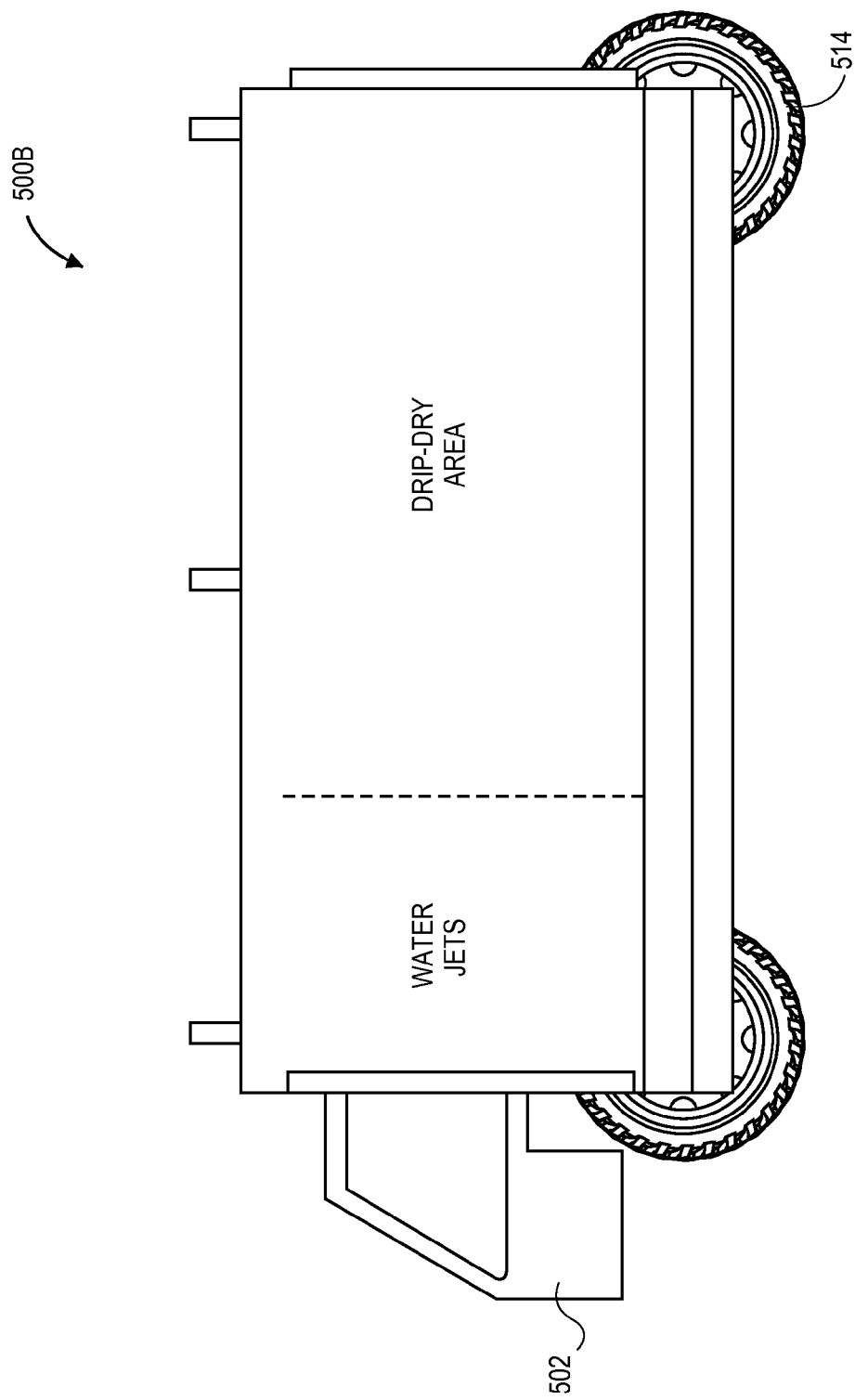
FIG. 5D illustrates a side-on, cross-sectional view of a solar system cleaning apparatus, in accordance with an embodiment of the present invention.
Figure 5E:
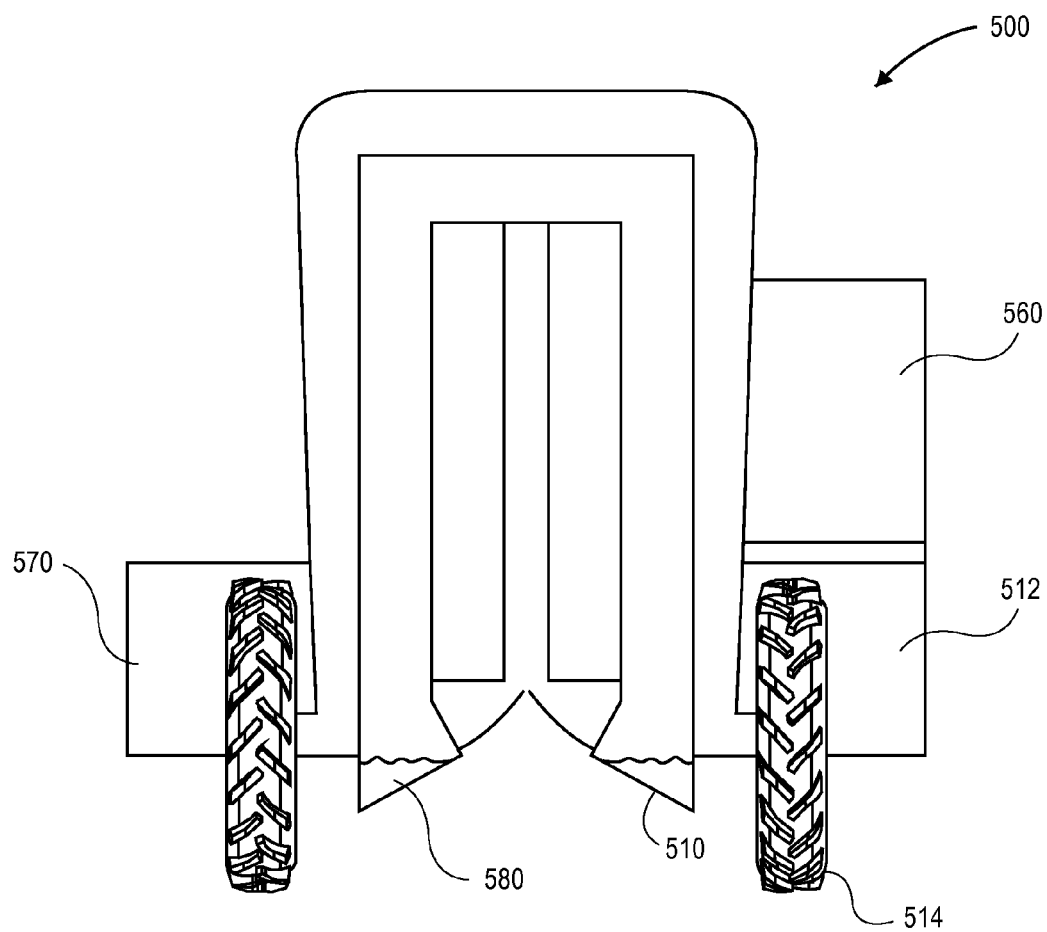
FIG. 5E illustrates an end-on view of a solar system cleaning apparatus, in accordance with an embodiment of the present invention.

Referring to FIG. 5C, which illustrates a side-on, cross-sectional view of a solar system cleaning apparatus, in one embodiment, a solar system cleaning apparatus 500A has a chassis 504 configured to house soap jets, brushes, water jets, and air knives, in that order. Referring to Referring to FIG. 5D, which also illustrates a side-on, cross-sectional view of a solar system cleaning apparatus, in one embodiment alternative the embodiment depicted in FIG. 5C, a solar system cleaning apparatus 500B has a chassis 504 configured to house water jets and a drip-dry area, in that order.

Figure 5F:
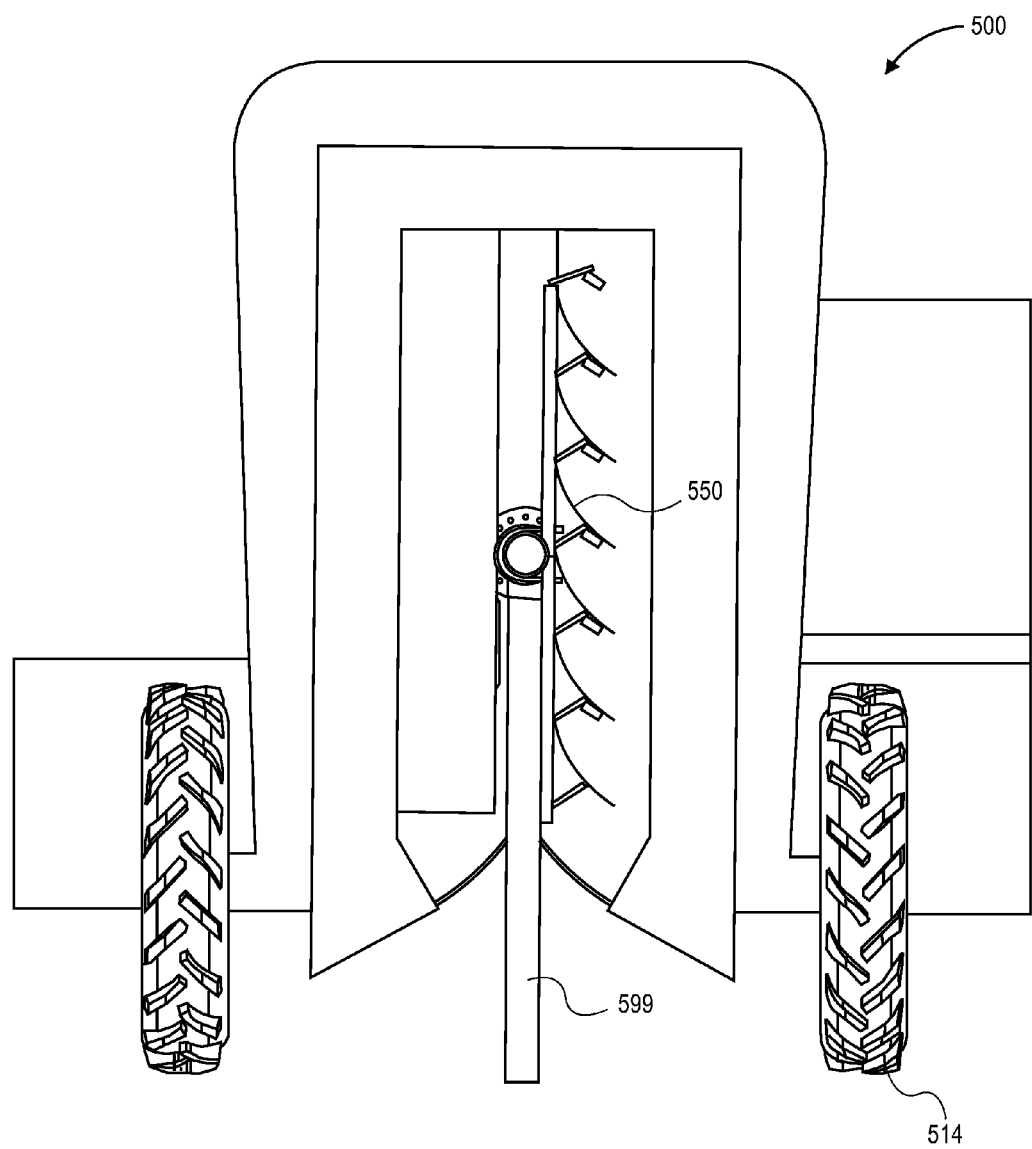
FIG. 5F illustrates an end-on view of a solar system cleaning apparatus coupled with a plurality of photovoltaic modules, in accordance with an embodiment of the present invention.

Referring to FIG. 5F, which illustrates an end-on view of solar system cleaning apparatus 500 coupled with a plurality of photovoltaic modules 550, struts or piers 599 used to support the plurality of photovoltaic modules 550 are accommodated by the flexibility of components of the inner housing of solar system cleaning apparatus 500.

In accordance with another embodiment of the present invention, a solar system cleaning apparatus includes a vehicle configured to ride on a rail system. For example, FIG. 6 illustrates a plan view of a solar energy collection system having a plurality of solar modules coupled with a solar system cleaning apparatus, in accordance with an embodiment of the present invention.

Figure 6:
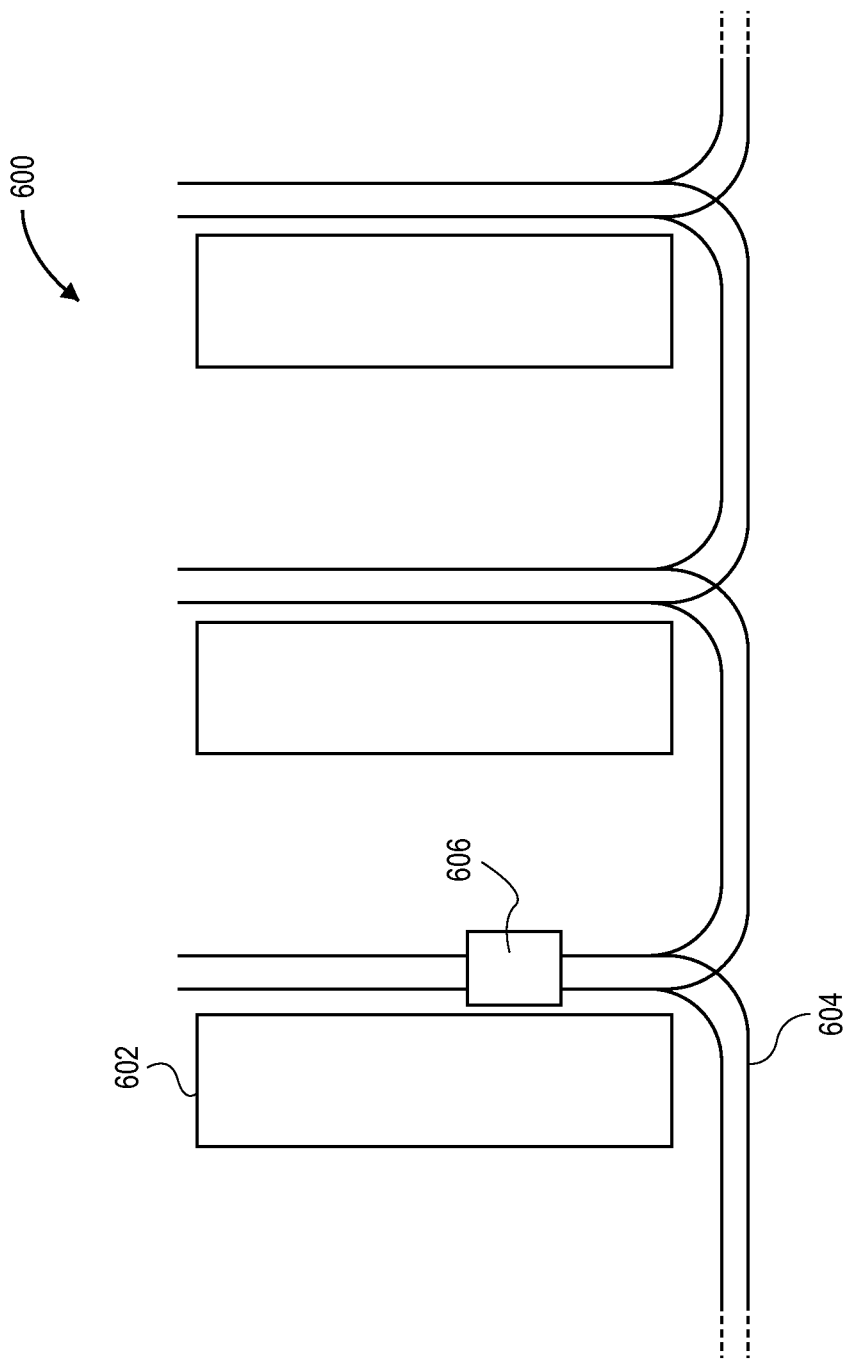
FIG. 6 illustrates a plan view of a solar energy collection system having a plurality of solar modules coupled with a solar system cleaning apparatus, in accordance with an embodiment of the present invention.

Referring to FIG. 6, a solar energy collection system 600 includes a plurality of solar modules 602. A solar system cleaning apparatus is coupled with the plurality of solar modules 602 and includes a track-based vehicle 606. The solar system cleaning apparatus also includes a track system 604 to provide access of the track-based vehicle to each of the plurality of solar modules 602. Track system 604 may run along one side of each of a set of solar modules within the plurality of modules 602, as depicted in FIG. 6, or may include a track on either side of each of a set of solar modules within the plurality of modules 602.

In accordance with an embodiment of the present invention, track-based vehicle 606 includes a first basin mounted on track-based vehicle 606, the first basin to supply a cleaning medium to one or more of the plurality of solar modules 602. Track-based vehicle 606 also includes a second basin mounted on track-based vehicle 606, the second basin to collect the cleaning medium from the one or more solar modules of the plurality of solar modules 602. Track-based vehicle 606 also includes a filter coupled to the first basin and the second basin, the filter to transfer the cleaning medium from the second basin to the first basin.

In one embodiment, track-based vehicle 606 is configured to straddle the plurality of solar modules 602, and the first basin is configured to supply the cleaning medium to more than one side of each of the plurality of solar modules 602 at the same time. In one embodiment, track-based vehicle 606 is configured to over-hang the plurality of solar modules 602, and the first basin is configured to supply the cleaning medium to more than one side of each of the plurality of solar modules 602 at the same time. In one embodiment, track-based vehicle 606 is configured to be exposed to only one side of the plurality of solar modules 606, as depicted in FIG. 6, and the first basin is configured to supply the cleaning medium only to the one side of each of the plurality of solar modules 602 at a given time. In an embodiment, the second basin is configured to collect the cleaning medium from the one or more of the plurality of solar modules 602 by a technique such as, but not limited to, gravity collection or vacuum collection. In an embodiment, the solar system cleaning apparatus is configured to reuse the cleaning medium by supplying the cleaning medium to the same or another one or more of the plurality of solar modules 602 subsequent to transferring the cleaning medium from the second basin to the first basin. In an embodiment, each of the plurality of solar modules 602 is a concentrator-cell photo-voltaic module.

Figure 7:
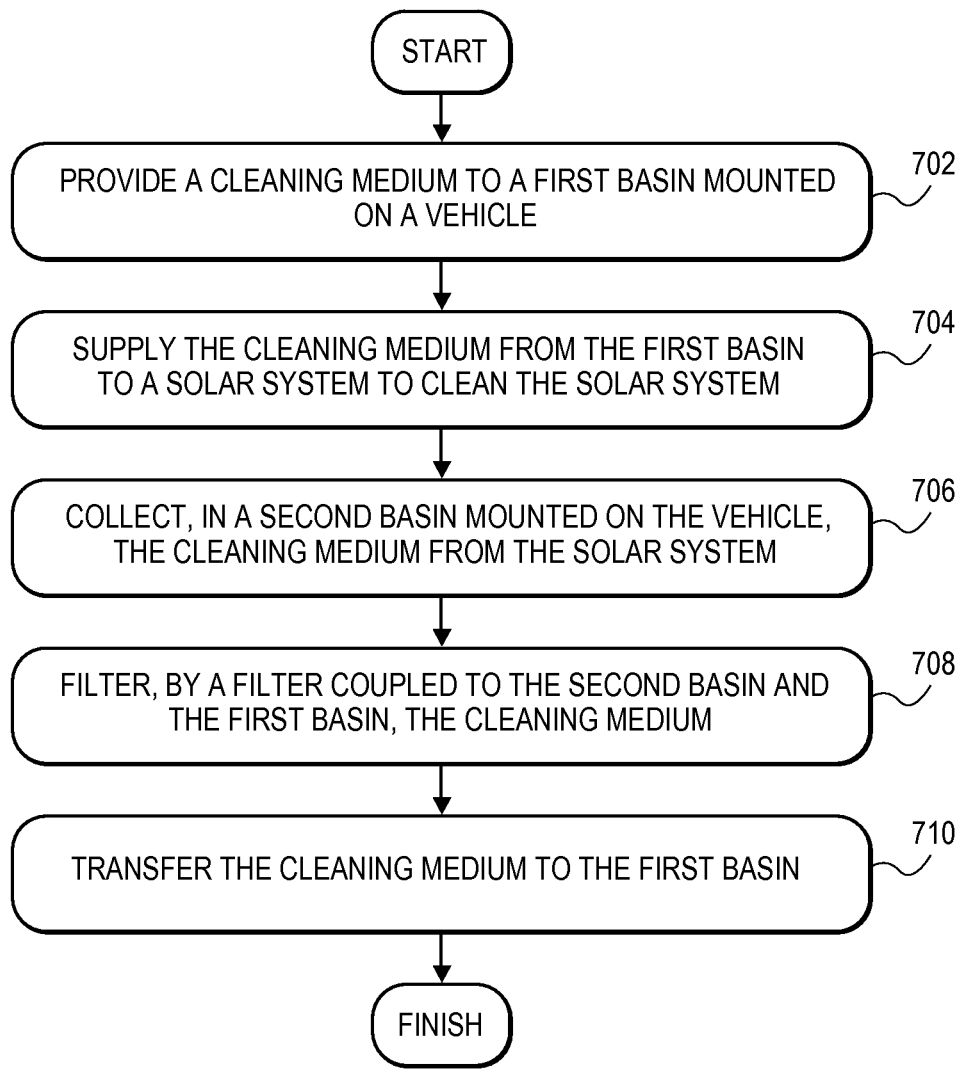
FIG. 7 illustrates a flowchart representing operations in a method of cleaning a solar system, in accordance with an embodiment of the present invention.

In an aspect of the present invention, a method of cleaning solar systems is provided. For example, FIG. 7 illustrates a flowchart 700 representing operations in a method of cleaning a solar system, in accordance with an embodiment of the present invention.

Referring to operation 702 of flowchart 700, a method of cleaning a solar system includes providing a cleaning medium to a first basin mounted on a vehicle.

Referring to operation 704 of flowchart 700, the method of cleaning a solar system also includes supplying the cleaning medium from the first basin to the solar system to clean the solar system. In accordance with an embodiment of the present invention, supplying the cleaning medium from the first basin to the solar system includes supplying the cleaning medium to more than one side of the solar system at the same time. In another embodiment, supplying the cleaning medium from the first basin to the solar system includes supplying the cleaning medium to only to the one side of the solar system at a given time.

Referring to operation 706 of flowchart 700, the method of cleaning a solar system also includes collecting, in a second basin mounted on the vehicle, the cleaning medium from the solar system. In accordance with an embodiment of the present invention, collecting the cleaning medium is performed by a technique such as, but not limited to, gravity collection or vacuum collection.

Referring to operation 708 of flowchart 700, the method of cleaning a solar system also includes filtering, by a filter coupled to the second basin and the first basin, the cleaning medium.

Referring to operation 710 of flowchart 700, the method of cleaning a solar system also includes transferring the cleaning medium to the first basin. In accordance with an embodiment of the present invention, the method of claim further includes re-using the cleaning medium by re-supplying the cleaning medium to the solar system subsequent to transferring the cleaning medium from the filter to the first basin.

It is to be understood that some embodiments do not necessarily require filtering a cleaning medium prior to re-use in a solar system cleaning apparatus. For example, in accordance with another embodiment of the present invention, a solar system cleaning apparatus includes a vehicle. A first basin is mounted on the vehicle, the first basin to supply a cleaning medium to a solar module. A second basin is mounted on the vehicle, the second basin to collect the cleaning medium from the solar module and to transfer the cleaning medium from the second basin to the first basin. In one embodiment, the cleaning medium does not pass through a filter upon being transferred from the second basin to the first basin in a reuse configuration. It is also to be understood that solar system cleaning apparatuses contemplated in some embodiments of the present invention are not confined to having four wheels or tires. For example in other embodiments, a solar system cleaning includes three or any other suitable number or wheels or tires.

Thus, solar system cleaning apparatuses and methods of cleaning solar systems have been disclosed. In accordance with an embodiment of the present invention, a solar system cleaning apparatus includes a vehicle. A first basin is mounted on the vehicle, the first basin to supply a cleaning medium to a solar module. A second basin is mounted on the vehicle, the second basin to collect the cleaning medium from the solar module. A filter is coupled to the first basin and the second basin, the filter to transfer the cleaning medium from the second basin to the first basin. In one embodiment, the vehicle is configured to straddle the solar module, and wherein the first basin is configured to supply the cleaning medium to more than one side of the solar module at the same time. In one embodiment, the vehicle is configured to over-hang the solar module, and wherein the first basin is configured to supply the cleaning medium to more than one side of the solar module at the same time. In one embodiment, the vehicle is configured to be exposed to only one side of the solar module, and wherein the first basin is configured to supply the cleaning medium only to the one side of the solar module. In one embodiment, the vehicle is configured to ride on a rail system.

What is claimed is:

1. A solar energy collection system, comprising:
    a plurality of solar modules; and
    a solar system cleaning apparatus coupled with the plurality of solar modules, the solar system cleaning apparatus, comprising:
    a track-based vehicle, wherein the track-based vehicle is configured to straddle the plurality of solar modules, comprising a first basin mounted on the track-based vehicle, the first basin to supply a cleaning medium to one or more of the plurality of solar modules without the track-based vehicle physically contacting the solar module and wherein the first basin is configured to supply the cleaning medium to more than one side of each of the plurality of solar modules at the same time, a second basin mounted on the track-based vehicle, the second basin to collect the cleaning medium from the one or more solar modules without the track-based vehicle physically contacting the solar module, and a filter coupled to the first basin and the second basin, the filter to transfer the cleaning medium from the second basin to the first basin; and
    a track system to provide access of the track-based vehicle to each of the plurality of solar modules.

2. The solar energy collection system of claim 1, wherein the second basin is configured to collect the cleaning medium from the one or more of the plurality of solar modules by a technique selected from the group consisting of gravity collection and vacuum collection.

3. The solar energy collection system of claim 1, wherein the solar system cleaning apparatus is configured to reuse the cleaning medium by supplying the cleaning medium to the same or another one or more of the plurality of solar modules subsequent to transferring the cleaning medium from the second basin to the first basin.

4. The solar energy collection system of claim 1, wherein each of the plurality of solar modules is a concentrator-cell photo-voltaic module.

5. A solar system cleaning apparatus, comprising:
    a vehicle, wherein the vehicle is configured to straddle a solar module;
    a first basin mounted on the vehicle, the first basin to supply a cleaning medium to the solar module without the vehicle physically contacting the solar module, and wherein the first basin is configured to supply the cleaning medium to more than one side of the solar module at the same time;
    a second basin mounted on the vehicle, the second basin to collect the cleaning medium from the solar module without the vehicle physically contacting the solar module; and
    a filter coupled to the first basin and the second basin, the filter to transfer the cleaning medium from the second basin to the first basin.

6. The solar system cleaning apparatus of claim 5, wherein the second basin is configured to collect the cleaning medium from the solar module by a technique selected from the group consisting of gravity collection and vacuum collection.

7. The solar system cleaning apparatus of claim 5, wherein the solar system cleaning apparatus is configured to reuse the cleaning medium by supplying the cleaning medium to the same or another solar module subsequent to transferring the cleaning medium from the second basin to the first basin.

8. The solar system cleaning apparatus of claim 5, wherein the solar module is a concentrator-cell photo-voltaic module.

9. The solar system cleaning apparatus of claim 5, wherein the vehicle is configured to ride on a rail system.

* * * * *